Sept. 17, 1963  E. MANCUSO  3,103,839
TOOL HOLDER
Filed May 29, 1961  4 Sheets-Sheet 1
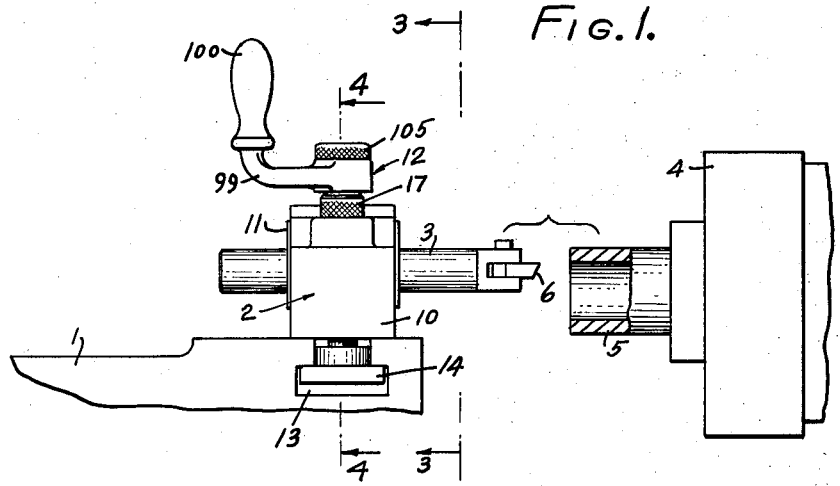
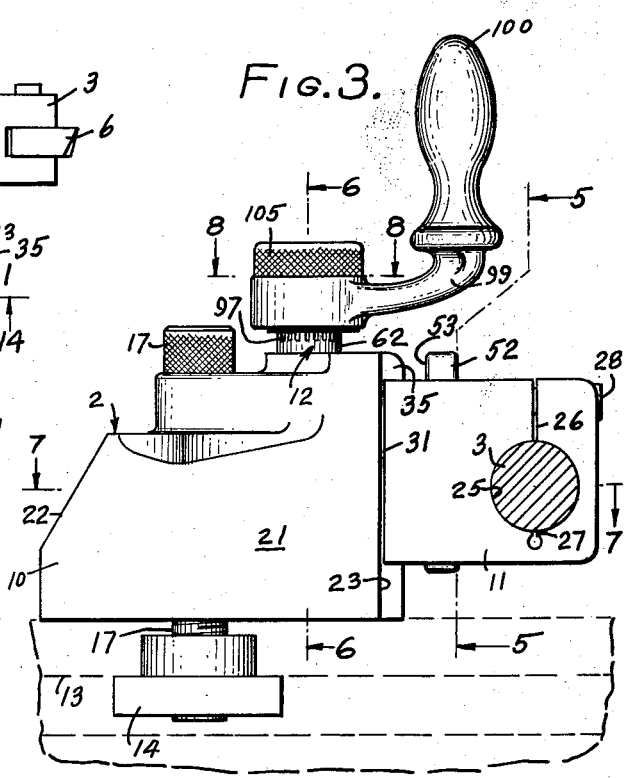
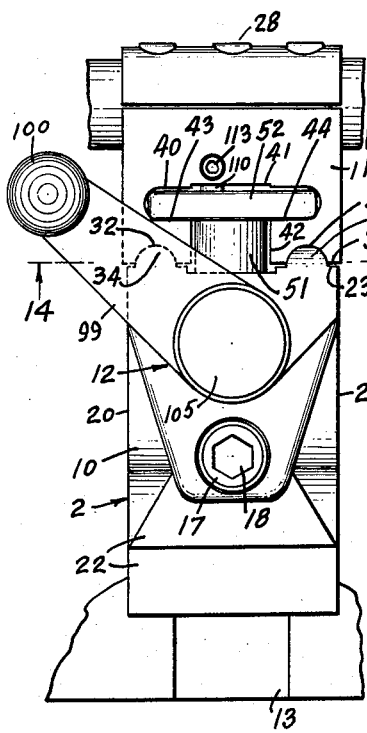
INVENTOR,
EMANUEL MANCUSO;
BY
Calvin Brown
ATTORNEY

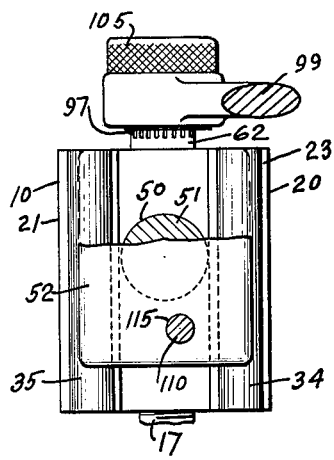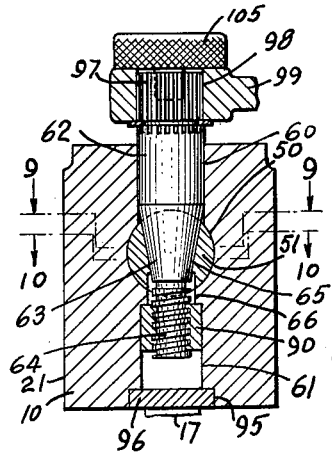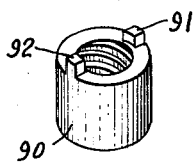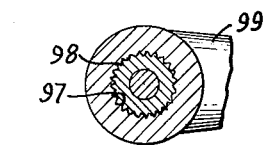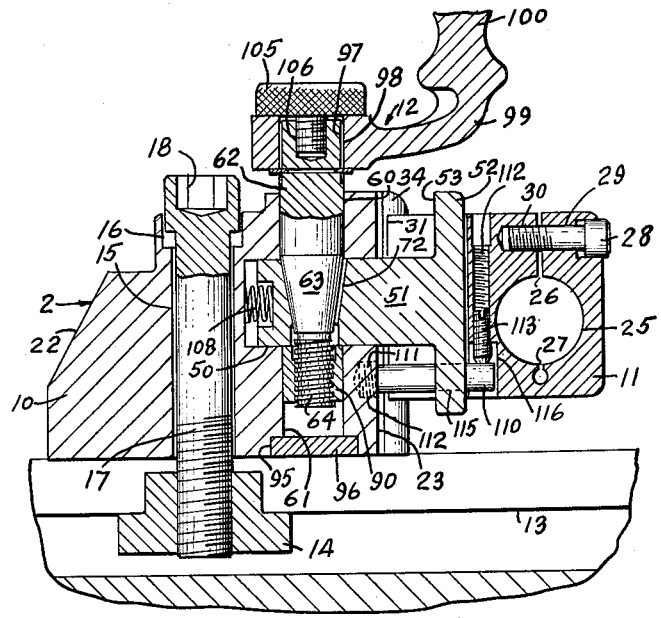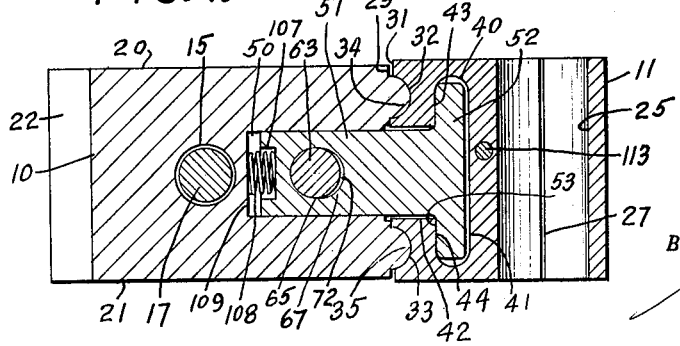

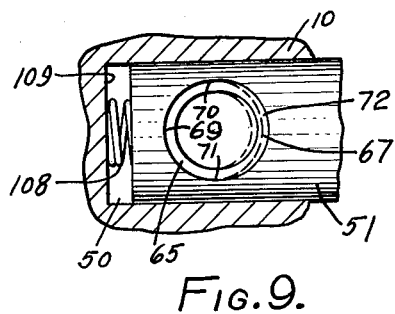
FIG. 9.
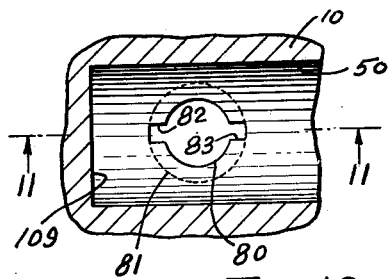
FIG. 10.
FIG. 11.
FIG. 12.
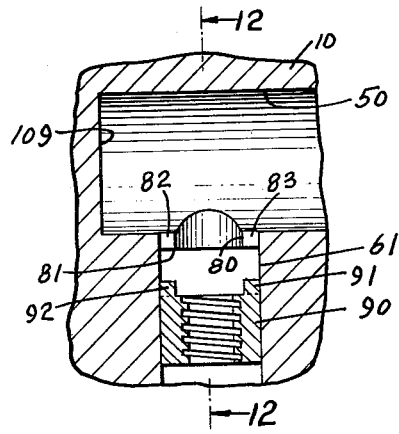
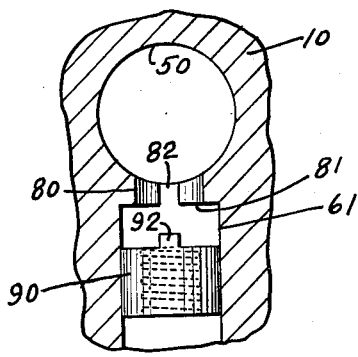
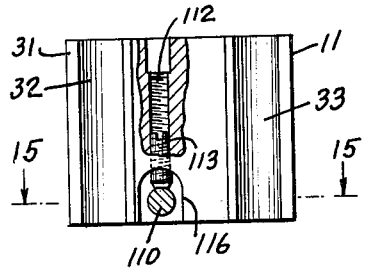
FIG. 14.
FIG. 15.
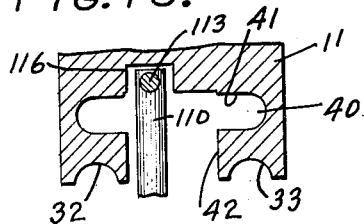
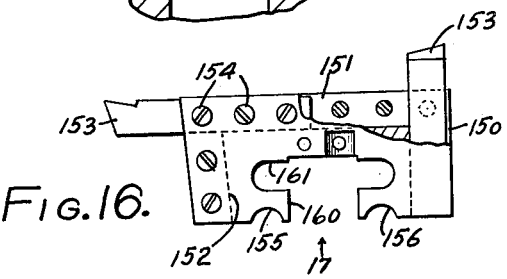
FIG. 16.
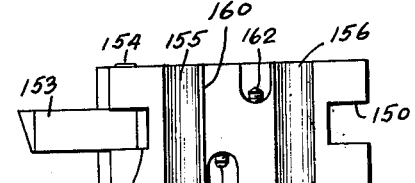
FIG. 17.
INVENTOR,
EMANUEL MANCUSO;
BY
Calvin Brown,
ATTORNEY

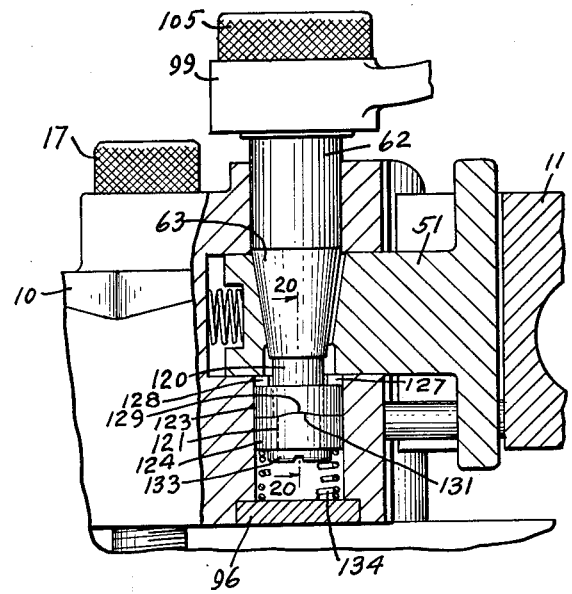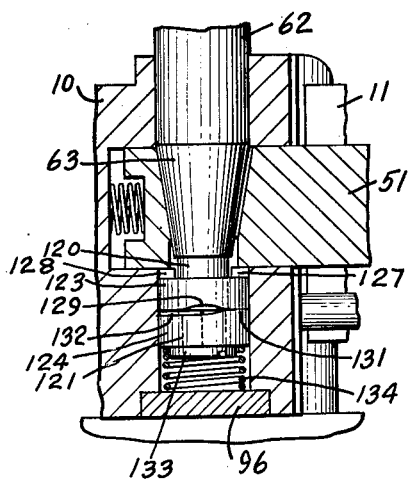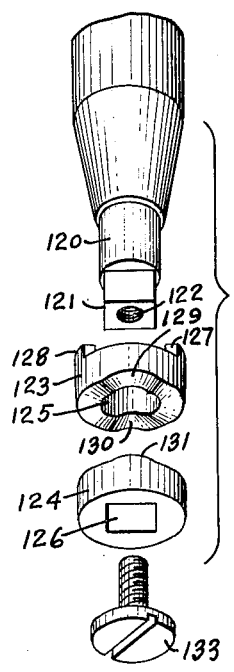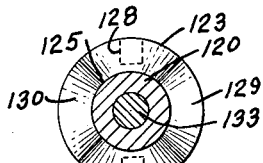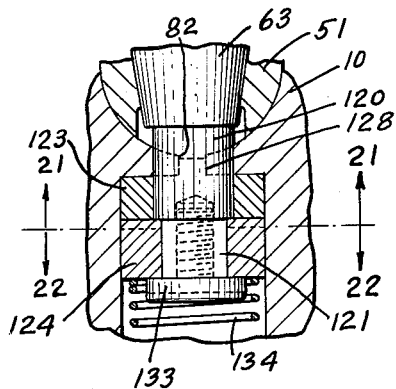

United States Patent Office 3,103,839
Patented Sept. 17, 1963

3,103,839
TOOL HOLDER
Emanuel Mancuso, 3516 W. Alameda, Burbank, Calif.
Filed May 29, 1961, Ser. No. 113,219
3 Claims. (Cl. 82—36)

The present invention relates to a tool holder for use on lathes and related machines and has for an object a construction which permits the changing of tools, such as tool bits, boring bars and the like, rapidly and the return thereof accurately to the same position on the holder for repetitive operations.

The design of the tool holder of the invention enables the operator to repeat to zero tolerance a change of adapters and with maximum rigidity.

A further object is the provision of a tool holder designed to hold adapters and wherein the adapters will not become loose after tightening in position to a master base.

A further object is the provision of a tool holder, the adapters of which, are removable vertically, whereby the carriage does not have to be moved backwardly after each operation.

A further object is the provision of a tool holder wherein adjustment of tool bits is accomplished without the use of shims, positively, accurately and in a minimum of time.

It is common practice in the art to provide a dovetail connection between the master base or body and an adapter or bar which holds either a boring bar tool holder or some form of bit. Usually one side of the dovetail tenon or slide is movable or a gib is provided in the slideway so that the dovetail connection may be clamped. Usually this is accomplished by means of a handle actuating means for moving the gib or the movable side of the tenon. If a heavy load is imposed upon the bit, oftimes a vibration is set up in the adapter or bar which loosens the handle and releases the adapter with the consequence that the workpiece is either ruined or other damage is caused such as injury to the operator. In any event, readjustment between the members is necessary.

An object of my invention is to provide a construction wherein the adapter that holds the bit may be locked to the master base in such a manner that no loosening therebetween can occur even when vibration is set up in the adapter. I accomplish this object by so arranging the elements of my invention that there is a resolution of forces acting to hold the adapter and master base against unwarranted release when locked together.

The invention has for a further object the provisions of a tool holder so designed as to meet the needs of economic manufacture, of few parts, positive in its operation and generally superior to tool holders now known to the inventor.

With the above mentioned and other objects in view, the invention consists in the novel and useful provision, formation, construction, association and relative arrangement of parts, members and features, all as disclosed in certain embodiments in the drawings, described generally and more particularly pointed out in the claims.

In the drawings:

FIGURE 1 is a fragmentary, partially sectional detached view showing a portion of a lathe chuck holding a work piece and the tool holder of the invention mounted on a lathe compound rest, the tool holder mounting a boring bar carrying a cutter for engagement with the work piece;

FIGURE 2 is a fragmentary, top plan view of the tool holder shown in FIGURE 1, and on an enlarged scale;

FIGURE 3 is a fragmentary, partially sectional view, on an enlarged scale, taken on the line 3—3 of FIGURE 1;

FIGURE 4 is a fragmentary, sectional view on an enlarged scale and taken on the line 4—4 of FIGURE 1;

FIGURE 5 is a fragmentary, partially sectional view on the line 5—5 of FIGURE 3;

FIGURE 6 is a fragmentary, sectional view on the line 6—6 of FIGURE 3;

FIGURE 7 is a fragmentary, sectional view on the line 7—7 of FIGURE 3;

FIGURE 8 is a fragmentary, sectional view on the line 8—8 of FIGURE 3;

FIGURE 9 is a fragmentary, sectional view on an enlarged scale, and taken on the line 9—9 of FIGURE 6;

FIGURE 10 is an enlarged fragmentary, partially sectional view on the line 10—10 of FIGURE 6;

FIGURE 11 is a fragmentary, partially sectional view on the line 11—11 of FIGURE 10;

FIGURE 12 is a fragmentary, partially sectional view and taken on the line 12—12 of FIGURE 11;

FIGURE 13 is a perspective view of a nut insert used in the invention;

FIGURE 14 is a fragmentary, partially sectional view on the line 14—14 of FIGURE 2;

FIGURE 15 is a fragmentary, sectional view on the line 15—15 of FIGURE 14;

FIGURE 16 is a fragmentary, partially sectional plan view of a dual purpose adapter for tool bits which may be used in the practice of the invention;

FIGURE 17 is a side elevation of the adapter shown in FIGURE 16, looking in the direction of the arrow 17;

FIGURE 18 is a fragmentary, cross-sectional view showing a portion of the master base or tool holder body and draw plate for an adapter with modified means for locking the draw plate to the master base, being on an enlarged scale from the scale shown in FIGURE 4;

FIGURE 19 is a fragmentary, cross-sectional view, the locking shaft being rotated to move the locking cam shown in FIGURE 18 to the position shown in FIGURE 19;

FIGURE 20 is a fragmentary, sectional view on an enlarged scale, and taken on the line 20—20 of FIGURE 18;

FIGURE 21 is a partial sectional view on the line 21—21 of FIGURE 20;

FIGURE 22 is a partial sectional view on the line 22—22 of FIGURE 20; and,

FIGURE 23 is a detached perspective view of certain elements of the locking shaft and cams.

Referring now to the drawings, I have shown in FIGURE 1 a lathe compound rest 1, the tool holder of the invention designated generally as 2, a boring bar 3 carried by the tool holder, a lathe chuck at 4 securing a workpiece 5 in position to be engaged by a bit 6 carried by the boring bar. All of these elements or members are used in the practice of one embodiment of the invention. As shown in FIGURES 2 and 3, the tool holder 2 includes a master base or body 10, an adapter, tool block or bar 11 carried by the master base or body 10 and means designated generally as 12 for adjustably securing the adapter in position to the master base 10.

As is usual practice, the lathe compound rest is provided with a T-slot 13 within which is positioned a T-nut 14 for slide movement. The master base is provided with a transverse bore 15 (FIG. 4) and an enlarged counterbore at 16 for the reception of a hold down bolt 17. The threads of the hold down bolt engage the threads of the T-nut. The head of the bolt is received in the counterbore 16 and as is usual practice the bolt head is provided with an angular sided socket 18 whereby through the medium of a suitable tool the bolt may be tightened to lock the master base on the lathe compound rest and against movement. Quite obviously the contacting surfaces of the lathe compound rest and the bottom surface of the master base are flat.

While the particular geometric form of the master base is relatively unimportant, still in the interest of definiteness of description, the master base should be of a weight and size sufficient to render the same stable when engaging the lathe compound rest. In the present instance the master base has a pair of substantially parallel side walls 20 and 21 (FIG. 2), an angular faced end wall 22 and a plane faced front wall 23 which is normal to base of the master base or body 10. The front wall 23 is formed for engagement with the adapter 11 and to hold the adapter against any side movement or any movement at all when the means 12 is locked.

Referring to FIGURE 4, the adapter 11 is transversely bored at 25 to receive the boring bar 3. In addition, the adapter is split at 26 and 27 diametrically of the bore 25 so that the boring bar 3 may be clamped against movement in the bore 25. Clamping is effected by a series of bolts 28, the bolts being received within smooth bores 29 and threaded bores 30, the threaded bores 30 engaging the threads of the bolts whereby when the bolts are tightened the heads of the bolts which are received in countersunk bores, will draw the split portions of the adapter together and thereby clamp the boring bar 3 in the bore 25. This is common practice in the art.

The end 31 of the adapter I term the inner wall and the inner wall is provided with two parallel spaced apart ways 32 and 33 (FIG. 2) which extend between the top and the base of the adapter. The ways 32 and 33 are substantially half round grooves. The front wall 23 of the master base is provided with two parallel rails or tongues 34 and 35 of half round section and the rails fit within the ways 32 and 33. It is a close tolerance fit to the end that there is no side play between the master base and the adapter. As shown in FIGURE 7, the front wall 23 of the master base and the inner wall 31 of the adapter are not in contact, contact being through the medium of the rails 34 and 35 within the ways 32 and 33.

The adapter is provided with a T-slot which extends between the top and base surfaces and the end 31, as shown in FIGURES 4 and 7. This slot is designated as 40, one portion 41 extending transversely of the adapter while the portion 42 is normal to the portion 41 and extends to the end 31 of the adapter. The walls 43 and 44 bounding the slot 41 are in alignment, of substantially equal size, and have true plane surfaces.

The master base 10 is formed with a cylindrical bore 50 positioned intermediate the width of the master base and opening outwardly from the wall 23. Likewise the bore 50 is intermediate the rails 34 and 35. The bore 50 is adapted to receive an arbor 51 for a draw plate 52. The draw plate is substantially rectangular, as shown in FIGURE 5 and is positioned within the slot 41, as shown in FIGURES 4 and 7. The draw plate has a width sufficient to bridge the centers of the ways 32 and 33 and the rails 34 and 35. The arbor 51 is integrally formed with the draw plate and extends normal to the inner surface 53 of the draw plate. The arbor is cylindrical and is passed through the slotted portion 42 of the adapter into the bore 50. It is intended that there should be a close tolerance between the wall bounding the bore 50 and the periphery of the arbor 51 of not less than .0005". Furthermore, the inner face 53 of the draw plate is plane so that when said surface is in engagement with the surfaces 43 and 44 bounding the slot 41, there is no play between the surfaces.

The master base is provided with bores 60 and 61 which are coaxial and extend between the top and base of the master base. The bore 50 is intermediate the bores 60 and 61. Bores 60 and 61 are adapted to accommodate certain elements of the locking means 12 and which means includes a locking shaft 62, a cylindrical portion of which is within the bore 60, see FIGURE 4. The shaft has a tapered portion at 63 and in the form of locking shaft shown in FIGURE 4, has a threaded end portion 64 extending from the tapered portion 63. The locking shaft is adapted to move the draw plate to lock the adapter and the master base against movement by tightening the rails 34 and 35 within the ways 32 and 33. Thus the arbor 51 is provided with a transverse tapered bore 65 which receives the tapered portion 63 of the locking shaft. The tapered bore 65 of the arbor merges with a cylindrical bore 66 through which the threaded end portion 64 of the shaft 62 extends. The tapered bore 65, which may be termed a taper seat, is formed in the manner shown in FIGURE 9 by providing two tapered bores of identical size and offsetting one relative to the other, as indicated at 67. In other words, one taper bore is eccentric to the other taper bore 69, by way of illustration, is so formed that the bores would intersect at the points 70 and 71, the intersecting points being eccentric to the diametric center of the bore 69. This provides what I term a relief area, as hereinafter set forth. Clearance is effected at 72 between the periphery of the tapered portion of the locking shaft and the tapered bore, as shown in FIGURE 4. As shown in FIGURES 11 and 12, the reduced size bore 66 in the arbor 51 (FIG. 6) is continued as to bore size in the master block, as shown at 80, and communicates coaxially with the bore 61. This construction provides a shoulder at 81 of substantially annular form and the shoulder is diametrically slotted to provide slots 82 and 83, see FIGURE 10. An internally threaded nut 90, in FIGURE 13, is provided at one end with diametric ears or lugs 91 and 92, and has press fit within the bore 61, the lugs 91 and 92 being received within the slots 82 and 83 to prevent turning of the nut. The threaded end 64 of the locking shaft engages the threads of the nut 90, as shown in FIGURE 4. Preferably, I provide an enlarged counterbore 95 concentric with the bore 61, which counterbore receives a plug 96. The locking shaft, on the portion external the master base, is splined or serrated as shown at 97, FIGURE 6, to receive a correspondingly serrated portion 98 of a crank 99 having the usual handle 100, the hub portion of the crank being held in engagement with the serrations of the locking shaft by means of a knurled headed screw 105, the end of the locking shaft being formed with a threaded bore 106 to receive the threaded shank of the screw.

The end of the arbor 51 is socketed at 107 to receive one end of a coil spring 108, the opposite end of the spring bearing against wall 109 forming the inner terminus of bore 50. This spring constantly urges the arbor to move outwardly of the bore.

Extending outwardly of the surface 23 of the master base and normal to said surface, is a stop pin 110, FIGURE 4. This stop pin is received within the slots 41 and 42 and into a slot 116 of the adapter (FIGS. 4 and 15). The pin end does not engage any wall bounding the slots and the pin may be conveniently held to the master base by providing a screw headed end for the pin received in a screw threaded bore in the master base at 111 (FIG. 4).

The adapter is provided with a threaded bore 112 positioned intermediately between the slot 40 and the bore 25 for receiving an adjusting screw 113, the tip of which is adapted to engage the stop pin 110. A turning of the adjustment screw 113 elevates or lowers the adapter relative to the master base, for centering the bit 6 relative to the work piece 5. As shown in FIGURE 4, the draw plate is transversely bored at 115 to permit passage of the stop pin therethrough.

Referring now to FIGURES 18 to 22 inclusive, I have modified the locking shaft in certain details. The adapter, draw plate, arbor and master base remain the same, as shown for instance in FIGURE 4 with the exception that in place of using the nut 90 fitted within the bore 61 for engagement with the threaded tip 64 of the locking shaft, I have provided below the tapered portion thereof a cylindrical portion 120 terminating in a square end shank portion 121. The end of the shank is bored inwardly and screw threaded at 122 and all parts of the locking shaft lie on the same axis. The remainder of the locking shaft is the same in construction as that shown in FIGURE 4. Two cylindrical face cams are provided at 123 and 124. Face cam 123 is substantially annular in form in that it has a center bore 125 so as to fit on the cylindrical portion 120. The face cam 124 is provided with a square opening 126 to fit upon the square shank portion 121 of the locking shaft. The end of the cam 123, opposite the cam face is provided with a pair of diametric ears 127 and 128, which are received in the slots 82 and 83 of the master base for the purpose of preventing rotation of the cam on the cylindrical shank 120. The cam face of cam 123 has two diametrically disposed depressed segmental areas 129 and 130. These particular segments may subtend various degrees of arc. The face of the cam 124 has convex segmental areas which are complementary to the depressed areas 129 and 130 of cam 123, as shown at 131 and 132. The cams are held in assemblage on the portion provided therefor on the locking shaft by means of a headed screw 133, the shank of which is received within the threaded bore 122. The arrangement is such that a turning of the crank 99 through an arc of approximately 39° will tighten the tapered portion of the shaft within the tapered bore of the draw plate arbor to tighten the arbor or to release the same. To aid in this operation, when the crank 99 is rotated, I provide a helical coil spring 134 between the plug 96 and the cam 124, the helical spring having a diameter sufficient to span the head of the screw 133, see FIGURE 19.

In FIGURES 16 and 17 I have shown a type of adapter or bar which may be used in the practice of the invention. This type of adapter comprises a block which is notched or grooved on three sides, as shown at 150, 151 and 152 to receive tool bits designated generally as 153. The tool bits are held within the notches by locking screws 154 carried by the adapter, the block having one surface provided with ways or parallel, half round grooves 155 and 156, identical in all respects with the ways or grooves 32 and 33, as shown in FIGURE 7. The block likewise is provided with a T-slot 160 identical with the T-slot 40 in that it has a transverse slot, as shown in FIGURE 7, at 41 and the slot 42. Likewise, the offset slot 161 opens into the T-slot for receiving the end of the stop pin, as shown at 110 in FIGURE 4. The slotted construction is the same in all instances. Adjustment bores, receiving screws for reception in the offset slots, are shown at 162 and 163, being identical with the arrangement shown in FIGURE 4 at 112 and 113 with the exception that oppositely positioned offset slots and screws are provided. This, for the reason that the adapter may be turned to various positions. That is to say, reversed as to the positions shown in FIGURES 16 and 17.

The operation, uses and advantages of the invention just described, are as follows.

Assuming use of the invention with a boring bar of the type shown in FIGURES 1 and 3, the boring bar is placed within the adapter bore 25 and tightened through the medium of the screws 29 which draws the split portions of the adapter together (FIG. 4). The height of the adapter relative to the work piece is governed by the adjusting screw 113 which engages the stop pin 110 to either elevate or lower the adapter. It is, of course, assumed that the master base is adjusted as to position on the lathe compound rest and that the hold-down bolt 17 has been tightened in the nut 14. The adapter and master base are then locked together by revolving the crank 99 to cause the locking shaft and particularly the tapered portion thereof to move within the tapered bore of the arbor 51. This moves the draw plate towards the master base and causes tight engagement between the rails of the master base and the ways of the adapter. This locking is positive either through the medium of the nut and screw arrangement shown at 64 and 90, in FIGURE 4, or by the cam control as shown in FIGURES 18 to 20 inclusive. As there is a close fit between the rails and ways, locking shaft within the bore 60, and the arbor 51 of the draw plate within bore 50, there is no side play in any plane of the adapter relative to the master base with the result that heavy cuts may be made by a bit on the work piece, the adapter released from locking engagement from the master base and removed to thereafter be replaced in position on the master base without disturbing the original adjustment for repetitive operations upon the work piece. The device of the invention allows absolute repetition to zero tolerance when changing adapters and provides for maximum rigidity.

It is intended that the locking shaft when turned through approximately 39° should tighten the adapter to the master base or cause release of the adapter from the master base upon a reverse turning, the draw plate arbor releasing engagement between the ways of the adapter and the rails of the master base without binding through the medium of the coil spring 108 which constantly urges the arbor outwardly from the bore 50 and likewise due to the eccentric relationship of the two bores which form the tapered bore in the arbor. As has been pointed out, the intersection between the two tapered bores is beyond the center line or axis of one of the bores to the end that there is no bind at the point of contact between the tapered portion of the shaft and the tapered bore which would prevent arbor movement.

I claim:

1. A tool holder including: a master base adapted to be adjustably secured to a lathe compound rest, said master base having a plane base surface, a top, and an end surface provided with a pair of spaced apart rails normal to the base surface, said master base provided with a smooth bore extending between the base and top and provided with a second smooth bore which intersects the first named bore at right angles thereto and extending outwardly of the end between the pair of parallel rails; an adapter for tool bits formed at one end with a pair of parallel spaced apart ways for receiving the pair of rails therein, said adapter having top and base surfaces and provided with a T-slot extending transversely between the top and base surfaces, a T-type draw plate and arbor within the T-slot of the adapter, the arbor extending beyond an end of the adapter for reception in the second named bore of the master base, the draw plate having a width sufficient to bridge the pair of rails, a locking shaft in the first named bore of the master base, said arbor provided with a transverse tapered bore and said locking shaft having an upper portion adapted to receive at its top a handle to rotate the shaft, below that a smooth cylindrical portion in said first named bore and below the cylindrical portion an intermediate tapered portion positioned within said tapered bore and a lower portion in said first named bore having means for causing axial travel of the locking shaft when the locking shaft is rotated to cause movement of the arbor and draw plate to lock the rails in the ways.

2. The device of claim 1, in which the last mentioned means includes coaxial face cams having complementary segmental convex and concave areas, one of which cams is annular and slidably mounted on the locking shaft and held against rotation, and the other face cam is mounted to turn with the locking shaft.

3. The device as set forth in claim 1, said last-named means for causing axial travel of the locking shaft comprising: a nut within the lower part of the first bore of the master base having means to prevent rotation, the end of the locking shaft beyond the intermediate tapered portion thereof provided with screw threads for engagement with the locking nut.

References Cited in the file of this patent

FOREIGN PATENTS

| | | |
|---|---|---|
| 330,218 | Switzerland | July 15, 1958 |
| 608,585 | Germany | Jan. 26, 1935 |
| 1,052,998 | France | Sept. 30, 1953 |